US006831456B2

(12) United States Patent
Doescher

(10) Patent No.: US 6,831,456 B2
(45) Date of Patent: Dec. 14, 2004

(54) ANGLE SENSOR AND METHOD OF INCREASING THE ANISOTROPIC FIELD STRENGTH OF A SENSOR UNIT OF AN ANGLE SENSOR

(75) Inventor: Michael Doescher, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/120,681

(22) Filed: Apr. 11, 2002

(65) Prior Publication Data

US 2002/0149358 A1 Oct. 17, 2002

(30) Foreign Application Priority Data

Apr. 14, 2001 (DE) .......................................... 101 18 650

(51) Int. Cl.[7] .......................... G01R 33/09; G01B 7/30
(52) U.S. Cl. .............. 324/207.21; 324/252; 324/207.25
(58) Field of Search ....................... 324/207.12, 207.22, 324/207.21, 207.2, 207.26, 252, 251, 207.25; 73/514.31, 717, 728, 862.69, 862.673; 338/32 R; 428/692; 702/156, 152

(56) References Cited

U.S. PATENT DOCUMENTS

| 4,841,235 | A | * | 6/1989 | Hastings et al. ........ 324/117 R |
|---|---|---|---|---|
| 5,287,238 | A | * | 2/1994 | Baumgart et al. .......... 360/314 |
| 5,534,355 | A | * | 7/1996 | Okuno et al. ............... 428/611 |
| 5,955,211 | A | * | 9/1999 | Maeda et al. ............... 428/692 |
| 6,031,273 | A | * | 2/2000 | Torok et al. ................ 257/421 |
| 6,124,047 | A | * | 9/2000 | Hasegawa ................... 428/692 |
| 6,304,074 | B1 | * | 10/2001 | Waffenschmidt ............ 324/202 |
| 6,326,781 | B1 | * | 12/2001 | Kunde et al. .......... 324/207.21 |
| 6,433,535 | B1 | * | 8/2002 | Marx et al. ............ 324/207.21 |

* cited by examiner

Primary Examiner—Jay Patidar
Assistant Examiner—Reena Aurora
(74) Attorney, Agent, or Firm—Aaron Waxler

(57) ABSTRACT

The invention relates to an angle sensor comprising at least two angle-offset anisotropic magnetoresistive sensor units comprising anisotropic magnetoresistive elements, in which the angle sensor comprises at least a device for increasing the anisotropic field strength of the sensor units. The invention also relates to a method of increasing the anisotropic field strength of a sensor unit of an angle sensor comprising magnetoresistive elements, in which a magnetic supporting field present in a preferred direction of the magnetoresistive elements is generated.

37 Claims, 7 Drawing Sheets

ANGLE SENSOR AND METHOD OF INCREASING THE ANISOTROPIC FIELD STRENGTH OF A SENSOR UNIT OF AN ANGLE SENSOR

The invention relates to an angle sensor comprising at least two angle-offset anisotropic magnetoresistive sensor units (AMR sensor unit) comprising anisotropic magnetoresistive elements (AMR elements). Such AMR sensors for angle measurement are used in different areas, often in automobile manufacture, in which such sensors are used, for example, as choke-angle sensors in combustion engines or steering angle recognition.

Such an angle sensor is known from German Offenlegungsschrift DE44 08 078A1.

When such angle sensors are used in a magnetic field which is clearly stronger than its anisotropic field strength, which is the typical field of use of the known AMR angle sensors, the sensor is driven into saturation so that it generates a characteristic with a sin (2α) periodical variation.

The sin (2α) periodical characteristic has the consequence that the angle sensor can only perform 180° angle measurements because, due to the periodicity, it is not possible to distinguish between 0° and 180°.

For a 360° angle measurement at higher field strengths, more complex sensors such as, for example, GMR sensors (giant magnetoresistive sensors) or technological systems with a plurality of sensors and toothed wheels are required, which leads either to a highly complex manufacture and an attendant increase of costs, or to the fact that the angle sensors can no longer operate without contact. Moreover, the long-term stability of GMR sensors is currently not quite clear.

It is therefore an object of the invention to provide an AMR angle sensor which can be manufactured in a simple and low-cost way and can also cover a range of 360°, even at high field strengths, as may particularly occur in automobiles.

This object is solved by an angle sensor which comprises at least two angle-offset anisotropic magnetoresistive sensor units comprising anisotropic magnetoresistive elements, in which the angle sensor comprises at least a device for increasing the anisotropic field strength of the sensor units, and by an angle sensor in which the magnetoresistive element comprises magnetoresistive layers, particularly magnetoresistive strips which have a substantially hyperboloid or asteroidal shape. The object is further solved by a method of increasing the anisotropic field strength of a sensor unit of an angle sensor comprising magnetoresistive elements, in which a magnetic supporting field present in the preferred direction of the magnetoresistive elements is generated, and by a method in which the magnetoresistive elements are built up of magnetoresistive layers, particularly magnetoresistive strips, in which the magnetoresistive layers are given a substantially hyperboloid or asteroidal shape.

According to the invention, the angle sensor comprises at least a device for increasing the anisotropic field strength of the sensor units used in the angle sensor. An angle sensor according to the invention utilizes the fact that the characteristic of an AMR angle sensor has a periodicity of sin (α) when the sensor is driven at field strengths below the anisotropic field strength. At such a periodicity, a 360° measurement is also possible.

Due to the use of an angle sensor with a device for increasing the anisotropic field strength of the sensor units, the anisotropic field strength can therefore be increased so far that even the high field strengths occurring particularly in automobiles but also in other areas are below the anisotropic field strength of the AMR angle sensor. Consequently, an AMR angle sensor is provided in a simple and low-cost way which renders a 360° measurement possible in a low-cost and contactless way, even at very high field strengths.

In a preferred embodiment, the device for increasing the anisotropic field strength of the sensor unit impresses a supporting field in a preferred direction of the magnetoresistive elements, which field increases the anisotropic field strength of the sensor units and the magnetoresistive elements (MR elements).

Typical field strengths for a supporting field in the preferred direction are between 1 and 10 kA/m, preferably between 1 and 6 kA/m, in which conventional magnetic field strengths are at about 4 kA/m. The measuring field strengths in which the angle sensor is used are of a similar order of magnitude, but the measuring field strength is preferably slightly smaller than the field strength of the supporting field. Typical measuring field strengths are in a range of 3 kA/m but are quite dependent on the fields in which they are used. In a preferred embodiment, a soft magnetic shield against external interference fields is advantageous.

The MR elements generally comprise parallel arranged MR strips which are aligned in a preferred direction but may also be formed differently.

In accordance with a preferred embodiment of the angle sensor according to the invention, the device for increasing the anisotropic field strength comprises at least a coil arrangement in which at least one external coil per magnetoresistive element is preferably used, which coil substantially completely surrounds the MR element so that, in the core area of the coil, the magnetic field is aligned in the preferred direction of the MR elements.

Instead of, or in addition to the external coils, another embodiment provides the possibility of using at least one thin-film coil integrated in the layout of each MR element.

Further possibilities of increasing the anisotropic field strength of the sensor units in accordance with the invention are in the field of using at least one magnet whose magnetic field is aligned in the preferred direction of the MR elements, for which both permanent magnets and electromagnets can be used. Permanent magnets are, however, preferred because they have less influence on the angle sensor during use.

It is to be noted that the devices for increasing the anisotropic field strength of the sensor units may be devices which permanently increase the anisotropic field strength such as, for example, the above-mentioned permanent magnet, while the invention also encompasses devices which can increase the anisotropic field strength in a discontinuous and a controlled manner as in, for example, the above-mentioned coil arrangements or in the case of electromagnets. In this case, the anisotropic field strength may be controlled temporally and as regards its extent, while the invention encompasses both a periodical and also a nonperiodical increase of the anisotropic field strength in the case of temporal control.

A further possibility for the device for increasing the anisotropic field strength is a hard magnetic layer which is provided on the MR elements. This device is a device which permanently increases the anisotropic field strength.

In a particularly preferred embodiment, the at least two angle-offset anisotropic magnetoresistive sensor units are tilted by an angle of 90°, which provides the possibility of a 360° measurement. In this respect it is to be noted that also a tilt of, for example, about 45° is possible and that the angle sensor according to the invention can be designed with the device for increasing the anisotropic field strength of the sensor units in dependence upon their field of use and in such a way that it only measures a reduced angle range of, for example, 180°. The angle sensor according to the invention is therefore not limited to a 360° AMR angle sensor, although this is a preferred field of use and the advantages of the angle sensor according to the invention become particularly manifest in such a measurement.

The MR elements in the sensor units preferably comprise MR layers, particularly MR strips having a predetermined length (l), width (b) and thickness (d). To further support an increase of the anisotropic field strength, it is particularly advantageous to have a possibly large ratio between the thickness (d) and the width (b), while ratios V=d/b are particularly preferred that exceed values of $4*10^{-3}$, particularly a ratio $V \geq 1.5*10^{-2}$.

It is further preferred to form at least one of the MR layers rectangularly, hyperbolically and/or asteroidally, so that an increase of the anisotropic field strength of the sensor element is also achieved.

It is further preferred that the MR layers consist of a material having a high intrinsic material anisotropy. In this respect, preferred materials are particularly NiCo 50:50 ($H_K$=2500), NiCo 70:30 ($H_K$=2500), CoFeB 72:8:20 ($H_K$=2000), NiFe 81:19 ($H_K$=250) in which $H_K$ is the intrinsic material anisotropy.

The choice of the ratio between the thickness and width of the MR layers as well as the choice of the geometrical shape of the MR layers and the material of the MR layers enhance the effect of the above-described devices for increasing the anisotropic field strength of the sensor units but they also increase the anisotropic field strength of the sensor units independently of the devices described above and are therefore to be considered as independent inventive aspects.

In accordance with a further independent inventive aspect, the angle sensor further comprises means for applying magnetic reversal coils, which means preferably comprise at least one coil arrangement. The external coils, or the internal thin-film coils integrated in the layout of the MR elements described above are also suitable as coil arrangements.

The magnetic reversal coils are at least used in a controlled manner at given points, where "flipping" of the characteristic curve is compensated, which occurs when the angle sensor is used in the range of anisotropic field strengths and moves in a limit range in which it generates characteristics with a sin (2α) periodicity and characteristics with a sin (α) periodicity, which leads to a spontaneous magnetic reversal in MR sensor elements.

The angle sensor according to the invention therefore provides the possibility of a 360° angle detection in that the anisotropic field strength is increased to such an extent that the field strength in which the sensor is used is clearly below the anisotropic field strength of the sensor, so that a characteristic with a sin (α) periodicity is generated, or in that the spontaneous reversal of magnetism (flipping of the characteristic curve) occurring in the limit range between the sin (2α) and the sin (α) periodicity is clearly defined by magnetic reversal coils so that a 360° signal is obtained after signal evaluation.

Dependent on the field of application, both measures can be used both jointly and separately.

A further embodiment of the angle sensor comprises a subsequently arranged or integrated signal electronic circuit which generates a post-correction of the output signals, particularly a correction which becomes necessary because of the above-described flipping of the characteristic curve so that also in this case a 360° signal is obtained, even when the means for applying magnetic reversal coils are not provided and the anisotropic field strength of the sensor unit is not clearly above the field strength in which the angle sensor is used, so that also this signal electronic circuit is an independent inventive aspect.

The invention further relates to a method of increasing the anisotropic field strength of a sensor unit of an angle sensor comprising magnetoresistive elements having a preferred direction, in which in accordance with the inventive method a magnetic supporting field in the preferred direction is generated. An AMR angle sensor can thereby be provided in a simple manner, which renders a 360° measurement possible, also at high field strengths. These and further advantages correspond to the advantages which have been explained with reference to the angle sensor according to the invention.

The supporting field may be applied both permanently and discontinuously, in which the above-mentioned devices and methods can be used for generating the supporting field. It is particularly preferred that the supporting field is generated by means of a coil arrangement or a magnet, while it is further possible to generate the supporting field by means of a hard magnetic layer which is provided on or beside the MR elements.

These and other aspects of the invention are apparent from and will be elucidated with reference to the embodiments described hereinafter.

In the drawings:

FIG. 3b is a side elevation of the MR element shown in FIG. 3a;

FIG. 4b is an enlarged elevational view of the range denoted by b in FIG. 4a;

FIG. 5b is a side elevation of the embodiment of the MR element shown in FIG. 5a;

FIG. 6b is a side elevation of the MR element shown in FIG. 6a;

Figures 7A, 7B, 7C:
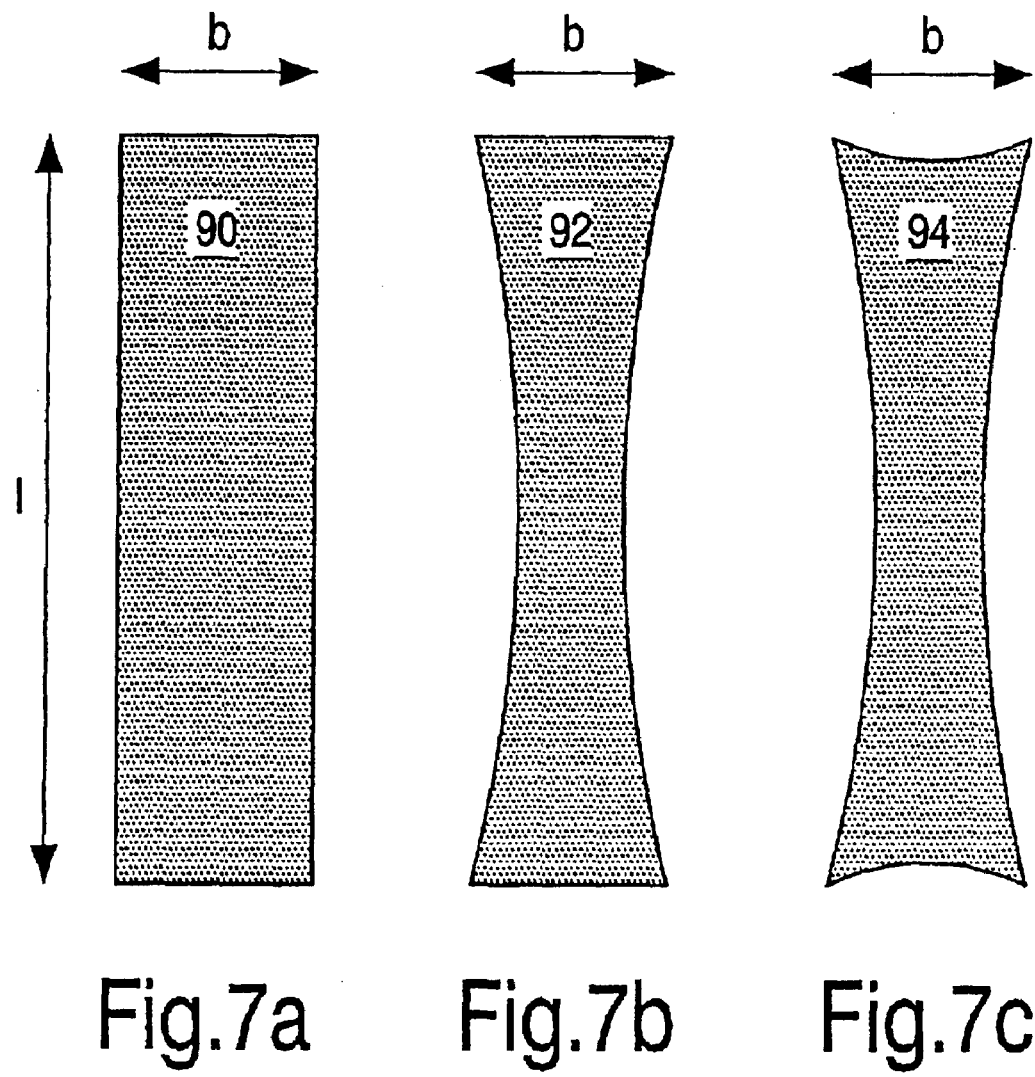

FIGS. 7a,b,c show possible geometrical shapes of MR strips according to the invention.

Figure 1:
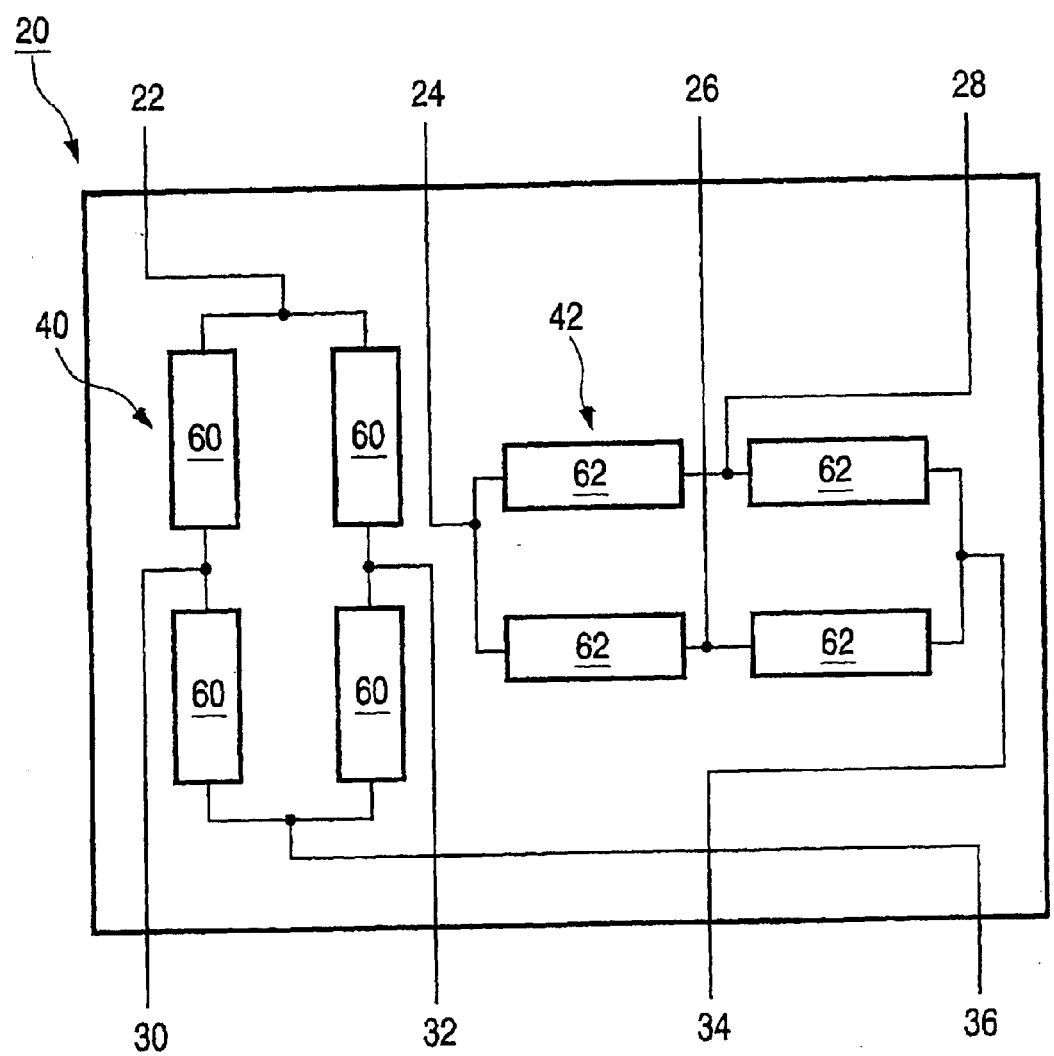
FIG. 1 shows a principal structure of an embodiment of an angle sensor according to the invention.

FIG. 1 shows diagrammatically the principal structure of a 360° AMR sensor 20 as a possible embodiment of a sensor according to the invention. The sensor comprises two DC separated sensor units 40, 42 one of which is aligned parallel to the chip sides (cos bridge) and another one is arranged at an angle of 90° thereto (sin bridge).

The bridges or sensor units 40, 42 comprise four anisotropic magnetoresistive elements (MR elements) 60 and 62, respectively.

The angle sensor 20 has terminals 22, 24, 26, 28, 30, 32, 34, 36.

Figure 2:
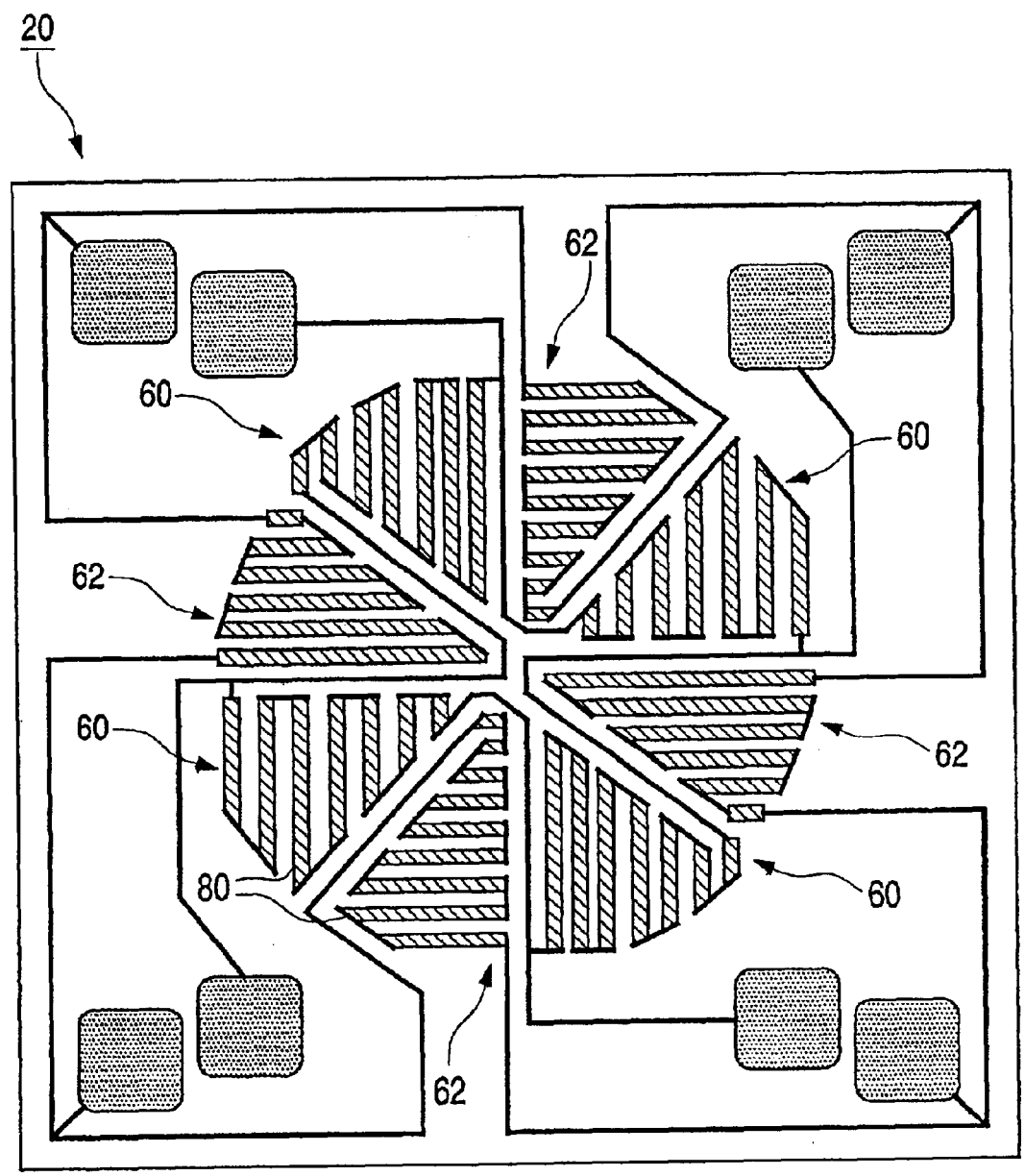
FIG. 2 shows an embodiment of a sensor whose principal structure is shown in FIG. 1.

A possible embodiment of an AMR sensor shown in FIG. 1 is shown diagrammatically in FIG. 2. The angle sensor 20 comprises the two sensor units (40, 42 see FIG. 1), in which each sensor unit comprises MR elements 60 and 62, respectively.

The MR elements 60, 62 of the two sensor units comprise anisotropic magnetoresistive strips (MR strips) 80 which are arranged always parallel to each other within each MR element 60, 62.

In the embodiment of the angle sensor 20 shown in FIG. 2, Barber pole structures with opposite inclination of the Barber pole in oblique parts of the resistive bridges are realized but the sensor may of course also be made without Barber poles. Both sensor units or bridges are rotated 90° with respect to each other and are interlaced.

Embodiments of MR elements according to the invention, which may be used in angle sensors and are shown in FIGS. 1 and 2, will now be described with reference to the following Figures.

Figure 3A:
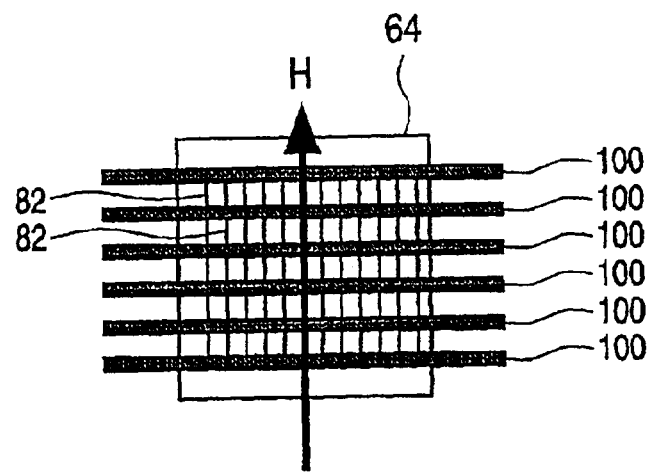
FIG. 3a is a plan view of an embodiment of an MR element with MR strips and an external coil according to the invention.

FIG. 3 is a plan view of an MR element 64 provided with MR strips 82. In this embodiment, a coil 100, which substantially completely surrounds the MR element 64, is used as a device for increasing the anisotropic field strength of the MR element.

Figure 3B:
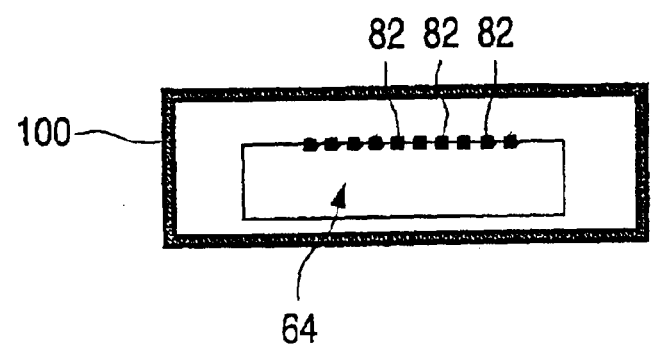

The shape of the coil 100 is particularly visible in FIG. 3b in which the MR element 64 can be clearly seen in a cross-section and has a surface on which the MR strips 82 have been provided. The coil 100 substantially completely surrounds the MR element 64.

Although the coil cross-section is shown rectangularly in this case, it may also assume any other arbitrary geometrical shape, for example, also a circular cross-section.

The coil 100 generates a substantially homogeneous magnetic field in the core, which field is denoted by the arrow H. The magnetic field is aligned substantially parallel to the longitudinal alignment of the MR strips which corresponds to the preferred direction of the MR strips. The MR strips of the embodiment shown in FIG. 3 have a thickness d of 120 nm and a width b of 6 $\mu$m so that a ratio $V=d/b=2*10^{-2}$ is realized.

Figure 4A:
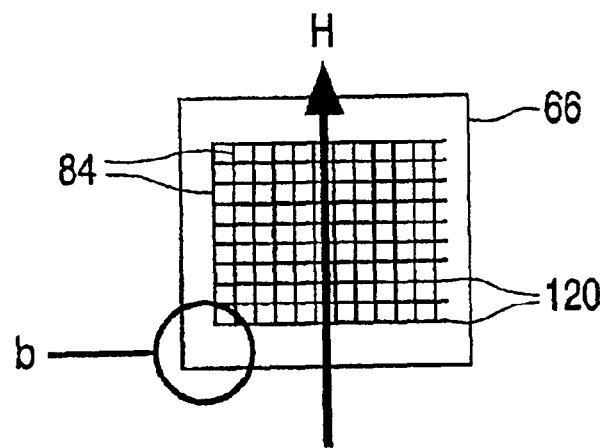
FIG. 4a is a plan view of an embodiment of an MR element with internal coils according to the invention.
Figure 4B:
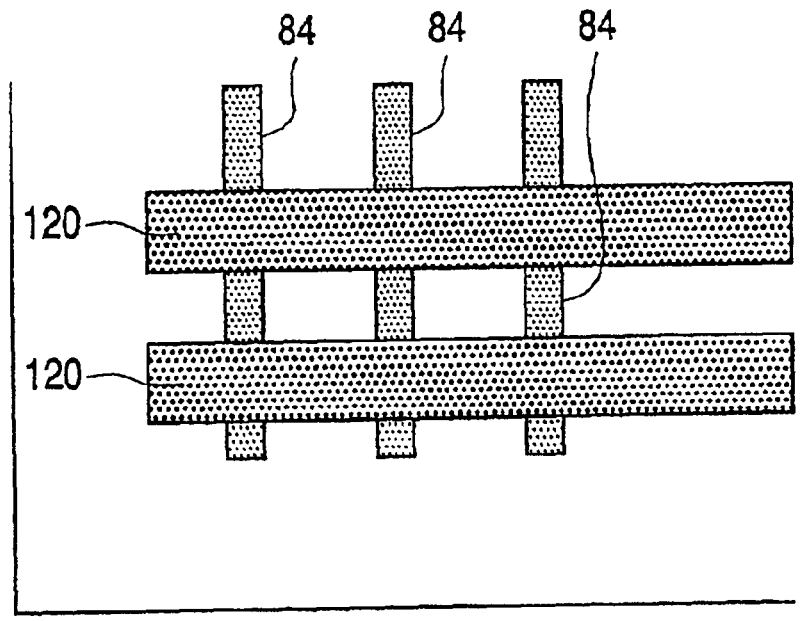

FIG. 4 shows a further embodiment of an MR element according to the invention. FIG. 4a is a plan view of an MR element 66 which, likewise as the element shown in FIG. 3a, also has longitudinal MR strips 84.

Instead of the coil surrounding the MR element, internal coils 120 are provided in this embodiment. The structure of an internal coil 120 is particularly clear from FIG. 4b in which the magnetic field H generated by the coil or the coils 120 substantially corresponds to the magnetic field H as is also generated in the embodiment shown in FIG. 3.

The coils 120 are thin-film coils integrated in the layout, so that the dimensions of the MR elements with the coils can be clearly reduced with respect to the dimensions of the embodiment shown in FIG. 3. The MR strips of the embodiment shown in FIG. 4 have a thickness d of 120 nm and a width b of 6 $\mu$m so that a ratio $V=d/b=2*10^{-2}$ is realized.

FIG. 5 shows a further embodiment of an MR element according to the invention. In this embodiment, the MR element 68 is provided on a permanent magnet 140 with a north pole N and a south pole S. Also in this embodiment, the magnet 140 generates a magnetic field H which is aligned in the direction of the MR strips 86 and the preferred direction of the MR element.

Figure 5A:
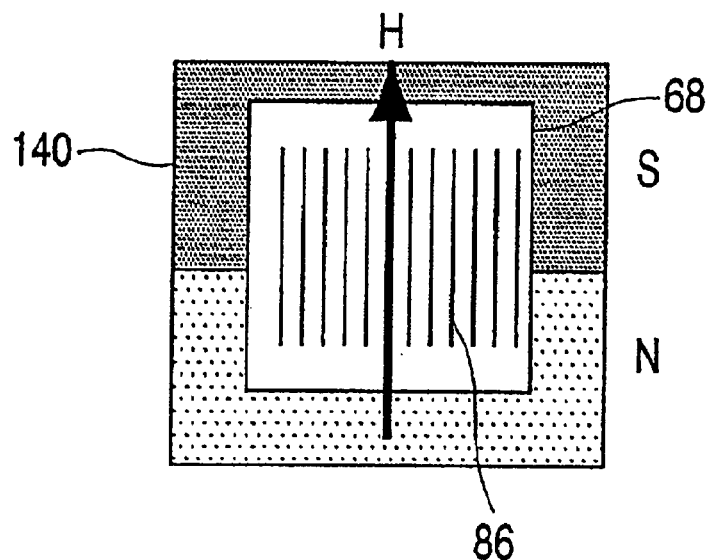
FIG. 5a is a plan view of an embodiment of an MR element with an external magnet according to the invention.
Figure 5B:
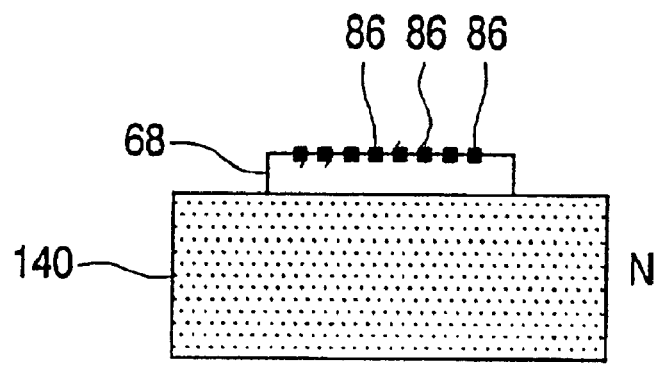

FIG. 5b is a side elevation of the embodiment shown in FIG. 5a, in which the structural form and the arrangement of the MR element 68 on the surface of the magnet 140 is clearly visible.

The embodiment shown in FIG. 5 is more voluminous as compared with the embodiment shown in FIG. 4 but this embodiment can be manufactured at low cost and is very reliable because of the relative insensitivity of the magnet. The MR strips in the embodiment shown in FIG. 5 have a thickness d of 180 nm and a width b of 6 $\mu$m so that a ratio $V=d/b=3*10^{-2}$ is realized.

Figure 6A:
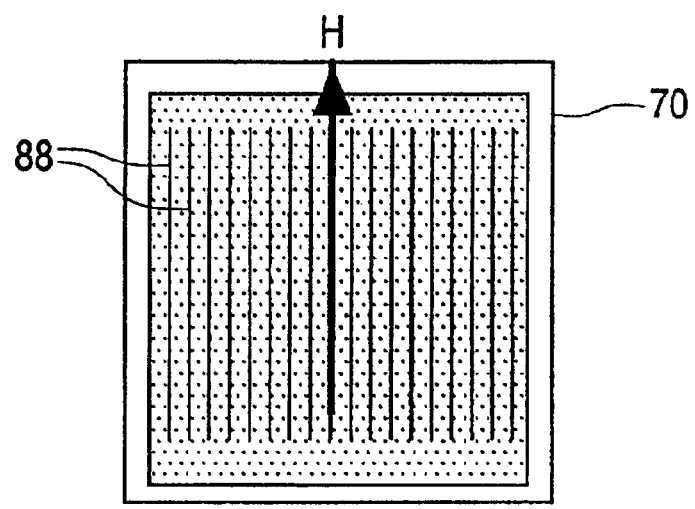
FIG. 6a is a plan view of an embodiment of an MR element with a hard magnetic layer according to the invention.

FIG. 6 shows a further embodiment of an MR element according to the invention. The MR element 70 is substantially analog to the MR elements shown in FIGS. 3 to 5, and in this embodiment MR strips 88 are also arranged in the preferred direction of the MR element 70.

Figure 6B:
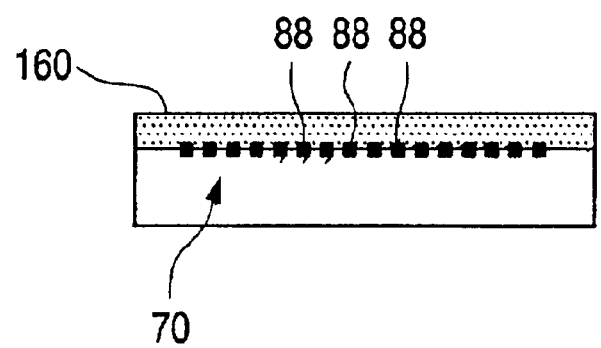

As is particularly clear from FIG. 6b, a hard-magnetic layer 160 is provided on the surface of the MR element 70 and above the MR strips 88 in this embodiment. This hard magnetic layer 160 also generates a magnetic field H in the preferred direction, analogously to the embodiments described hereinbefore.

It is to be noted that the embodiments shown only represent examples of possible MR elements and possible devices for increasing the anisotropic field strength of the sensor units, but those skilled in the art will be able to conceive further modifications within the scope of the invention, and can particularly combine partial elements of the embodiments shown.

The MR strips (80, 82, 84, 86, 88) are diagrammatically shown as lines only in FIGS. 3 to 6. The geometrical design may however, be varied in accordance with the invention, which is particularly shown in FIG. 7. The MR strips of the embodiment shown in FIG. 6 have a thickness d of 160 nm and a width b of 4 $\mu$m, so that a ratio $V=d/b=4*10^{-2}$ is realized.

FIG. 7a shows an MR strip 90 which is rectangular and has a length l in the preferred direction and a width b. FIG. 7b shows a further possible embodiment of an MR strip 92 which has a hyperboloid shape, whereas the MR strip 94 shown in FIG. 7c has an asteroidal shape.

The aspect ratio between length l and width b should be chosen to be as large as possible so as to achieve a high anisotropic field strength, and is in a range between 50 and 200 in the embodiment shown. A particularly preferred aspect ratio is about 100.

The characteristic features of the invention disclosed in the foregoing description, the drawings and the claims may be essential both individually and in an arbitrary combination for realizing the invention in its various embodiments.

What is claimed is:

1. A system comprising an angle sensor for measuring an angle comprising:
at least two angle-offset anisotropic magnetoresistive sensor units comprising anisotropic magnetoresistive elements, wherein the angle sensor has a 360 degree period and further comprises at least a device for increasing an anisotropic field strength of the sensor units to such an extent that the anisotropic field strength is higher than a field strength in an environment in which the sensor is used, and, an apparatus for generating said field strength in said environment.

2. A system as claimed in claim 1, wherein the device for increasing the anisotropic field strength comprises at least a coil arrangement.

3. A system as claimed in claim 2, wherein the coil arrangement comprises at least an external coil per magnetoresistive element which substantially surrounds the magnetoresistive element.

4. A system as claimed in claim 2, wherein the coil arrangement comprises at least a thin-film coil integrated in the layout of each magnetoresistive element.

5. A system as claimed claim 1, wherein the device for increasing the anisotropic field strength comprises at least a magnet.

6. A system as claimed in claim 5, wherein the magnet is a permanent magnet.

7. A system as claimed in claim 1, wherein at least the magnetoresistive element comprises a hard-magnetic layer provided thereon.

8. A system as claimed in claim 1, wherein the at least two angle-offset sensor units have an angle offset of 90°.

9. A system as claimed in claim 1, wherein the magnetoresistive elements comprise magnetoresistive layers of a predetermined length l, width b and thickness d, in which the ratio V between the thickness d and the width b has a value $V \geq 4*10^{-3}$.

10. A system as claimed in claim 9, wherein at least one of the magnetoresistive layers has a rectangular, hyperboloid or asteroidal shape.

11. A system as claimed in claim 1, wherein at least one of the magnetoresistive layers consists of a material from the following group: NiCo 50:50, NiCo 70:30, CoFeB 72:8:20, NiFe 8 1:19.

12. A system as claimed claim 1, wherein it further comprises a means for applying magnetic reversal pulses.

13. A system as claimed in claim 12, wherein the means for applying magnetic reversal pulses comprises at least a coil arrangement.

14. A system as claimed in claim 12, wherein the means for applying magnetic reversal pulses compensates a spontaneous reversal of magnetism.

15. A system as claimed in claim 1, wherein it further comprises subsequently arranged or integrated signal electronics.

16. A system as claimed in claim 1, wherein the magnetoresistive elements comprise magnetoresistive layers, which have a substantially hyperboloid or asteroidal shape.

17. A method of increasing an anisotropic field strength of a sensor unit of an angle sensor comprising magnetoresistive elements, wherein a magnetic supporting field (H) present in a preferred direction of the magnetoresistive elements is generated to such an extent that the anisotropic field strength is higher than a field strength in an environment in which the sensor is used, said method further comprising generating the field in said environment, and said sensor unit has a 360 degree period.

18. A method as claimed in claim 17, wherein the magnetic supporting field (H) is generated permanently or discontinuously.

19. A method as claimed in claim 17, wherein the supporting field (H) is generated by at least a coil arrangement.

20. A method as claimed in claim 17, wherein the supporting field (H) is generated by a magnet.

21. A method as claimed in claim 17, wherein the supporting field (H) is generated by a hard magnetic layer which is provided on at least one of the magnetoresistive elements.

22. A method as claimed in claim 17, wherein the magnetoresistive elements are built up of magnetoresistive layers, in which the magnetoresistive layers are given a substantially hyperboloid or asteroidal shape.

23. An angle sensor comprising at least two angle-offset anisotropic magnetoresistive sensor units comprising anisotropic magnetoresistive elements, wherein the angle sensor comprises at least a device for increasing the anisotropic field strength of the sensor units, wherein the magnetoresistive elements comprise magnetoresistive layers of a predetermined length l, width b and thickness d, in which the ratio V between the thickness d and the width b has a value $V \geq 4*10^{-3}$.

24. An angle sensor as claimed in claim 23, wherein at least one of the magnetoresistive layers has a rectangular, hyperboloid or asteroidal shape.

25. An angle sensor as claimed in claim 23, wherein the device for increasing the anisotropic field strength comprises at least a coil arrangement.

26. An angle sensor as claimed in claim 25, wherein the coil arrangement comprises at least an external coil per magnetoresistive element, which substantially surrounds the magnetoresistive element.

27. An angle sensor as claimed in claim 26, wherein the coil arrangement comprises at least a thin-film coil integrated in the layout of each magnetoresistive element.

28. An angle sensor as claimed in claim 23, wherein the coil arrangement comprises at least a thin-film coil integrated in the layout of each magnetoresistive element.

29. An angle sensor as claimed in claim 23, wherein the device for increasing the anisotropic field strength comprises at least a magnet.

30. An angle sensor as claimed in claim 29, wherein the magnet is a permanent magnet.

31. An angle sensor as claimed in claim 23, wherein at least the magnetoresistive element comprises a hard-magnetic layer provided thereon.

32. An angle sensor as claimed in claim 23, wherein the at least two angle-offset units have an offset angle of 90°.

33. An angle sensor as claimed in claim 23, wherein at least one of the magnetoresistive layers consist of a material from the following group: NiCo 50:50, NiCo7O:30, CoFeB 72:8:20, NiFe 81:19.

34. An angle sensor as claimed in claim 23, wherein it further comprises a means for applying magnetic reversal pulses.

35. An angle sensor as claimed in claim 34, wherein the means for applying magnetic reversal pulses comprises at least a coil arrangement.

36. An angle sensor as claimed in claim 34, wherein the means for applying magnetic reversal pulses compensates a spontaneous reversal of magnetism.

37. An angle sensor as claimed in claim 23, wherein it further comprises subsequently arranged or integrated signal electronics.

* * * * *